United States Patent [19]
Inomata

[11] Patent Number: 5,959,716
[45] Date of Patent: Sep. 28, 1999

[54] DATA RECORDING DEVICE FOR MOTION PICTURE FILM

[75] Inventor: Naoki Inomata, Kanagawa, Japan

[73] Assignee: Sony Cinema Products Corporation, Culver City, Calif.

[21] Appl. No.: 09/020,587

[22] Filed: Feb. 3, 1998

Related U.S. Application Data

[63] Continuation of application No. PCT/JP97/01998, Jun. 10, 1997.

[30] Foreign Application Priority Data

Jun. 10, 1996 [JP] Japan .................................. 8-147445

[51] Int. Cl.$^6$ .................................................. G03B 31/00
[52] U.S. Cl. .................................. 352/1; 352/27; 352/92
[58] Field of Search .................................. 352/5, 10, 20, 352/27, 37–92

[56] References Cited

U.S. PATENT DOCUMENTS

| | | | |
|---|---|---|---|
| 4,461,552 | 7/1984 | Levine | 352/27 |
| 4,544,259 | 10/1985 | Kanaoka et al. | 352/92 |
| 5,600,617 | 2/1997 | Saito | 352/27 |
| 5,761,349 | 6/1998 | Inatome et al. | 352/27 |
| 5,841,513 | 11/1998 | Yoshimura et al. | 352/27 |

FOREIGN PATENT DOCUMENTS

| | | |
|---|---|---|
| 0 675 398 | 10/1995 | European Pat. Off. . |
| 7-253625 | 10/1995 | Japan . |
| 8-7319 | 1/1996 | Japan . |

OTHER PUBLICATIONS

Patent Abstracts of Japan vol. 012, No. 261 (E–636), Jul. 22, 1988 & JP 63 046784 (Fujikura Ltd), Feb. 27, 1988.
Patent Abstracts of Japan, vol. 015, No. 158 (P–1193), Apr. 19, 1991 & JP 03 027031 A (Seiko Epson Corp.), Feb. 5, 1991.

*Primary Examiner*—Russell Adams
*Attorney, Agent, or Firm*—Frommer Lawrence & Haug, LLP; William S. Frommer

[57] ABSTRACT

A data recording apparatus for a motion picture film for digitally recording data concerning an image of the motion picture film. The data recording apparatus includes a plurality of light emission units (LEDs) 4 lighted responsive to the data concerning an image, a light volume detection units 5 for detecting the light emission volume of each of the light emission unit, a reference value outputting unit 6 for outputting a reference output specifying a reference value of the light emission volume of the light emission unit and a control unit 8 for comparing the reference output value of the reference value outputting unit 6 to each detected output value from the light volume detection unit 5 for controlling the light emission of the LEDs 4 so that each detected output value will be equal to the reference output value.

With the data recording apparatus for a motion picture film, each light emitting unit operates with the uniform light emission volume during data recording, thus enabling printing fluctuations of the recording pattern of the negative motion picture film for improving the SN ratio at the time of reproducing a positive film obtained from the negative film. Specifically, the negative film can be improved in quality inexpensively during recording of digital audio data on the motion picture film.

3 Claims, 12 Drawing Sheets

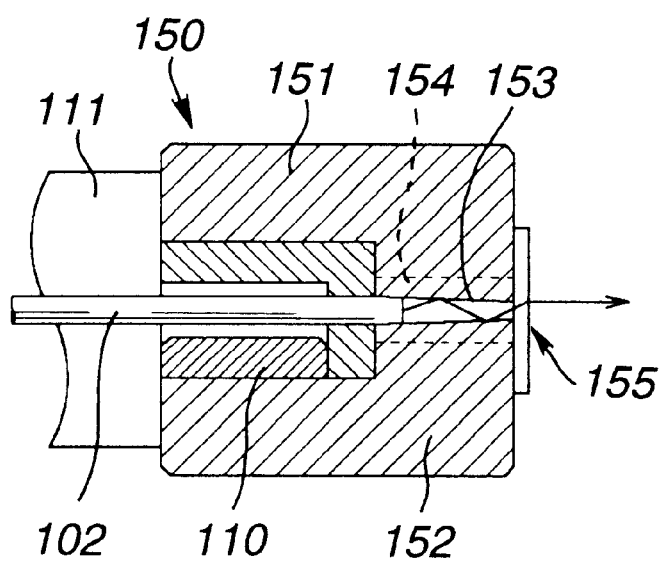 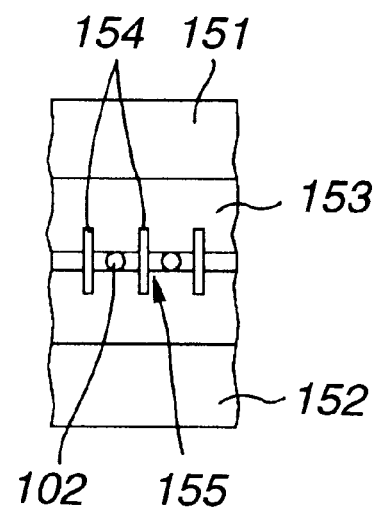
FIG.14(a)　　FIG.14(b)

DATA RECORDING DEVICE FOR MOTION PICTURE FILM

This is a continuation of copending International Application PCT/JP97/01998 having an international filing date of Jun. 10 1997.

TECHNICAL FIELD

This invention relates to a data recording device for a motion picture film for recoding digital audio information by dots on a motion picture film.

BACKGROUND ART

In general, a motion picture film has an image recording area in the form of a series of frames at a longitudinal mid portion on both sides of which are bored film takeup openings (perforations). Between the image recording area and one of the sides formed with the perforations, there is linearly formed an analog sound track in which to record audio signals in an analog form.

With recent progress in digital technology, there is a move of digitally recording the audio information. Since the recording positions for the image recording area and the analog sound track are standardized by the Society of Motion Picture and Television Engineers (SMPTE) which is an association of motion picture and television engineers in the United States, the digitized audio information needs to be recorded in other areas than the above-mentioned image recording area or the analog sound track.

Thus, the conventional practice has been to use a redundant area between the right-hand side perforations and the right-hand side edge of the motion picture film as a digital sound track for the right channel and to use a redundant area between the left-hand side perforations and the left-hand side edge of the motion picture film as a digital sound track for the left channel, with the audio data being recorded linearly along the film proceeding direction.

Meanwhile, there is known such a data recording device for the motion picture film having, as a head portion, an LED array comprised of plural light emitting diodes (LEDs) in accordance with a data pattern.

With this data recording device for the motion picture film, the LEDs are lighted responsive to audio data. On lighting the LEDs, the electrical audio data are converted into light audio data which is illuminated via a recording lens on each digital sound track of the motion picture film. Thus, the motion picture film is sensitized responsive to the light audio data to record the audio data in a dot pattern.

In the data recording device for the motion picture film having such LED array in its head portion, in which the same current is caused to flow in each LED to light it, the same amount of light is not necessary produced from the LEDs due to differences in characteristics from one LED to another.

The effect due to light volume variations is manifested as burning variations of the recording patterns at the time of recording data on a negative film. These burning variations are responsible for printing variations at the time of preparation of positive films. If these positive films are reproduced by a film digital audio reproducing device, the SN ratio of the digital signal is worsened.

In view of the above-described status of the art, it is an object of the present invention to provide a data recording device for a motion picture film in which the negative film can be improved in quality inexpensively when recording digital audio data on a motion picture film.

DISCLOSURE OF THE INVENTION

The present invention provides a data recording apparatus for a motion picture film for digitally recording data concerning an image of the motion picture film including a plurality of light emission means lighted responsive to the data concerning an image, light volume detection means for detecting the light emission volume of each of the light emission means, reference value outputting means for outputting a reference output specifying a reference value of the light emission volume of the light emission means and control means for comparing the reference output value of the reference value outputting means to each detected output value from the light volume detection means for controlling the light emission of the light emission means so that each detected output value will be equal to the reference output value.

The data recording apparatus also includes memory means for storing the light emission control value of each light emission means when each detected output value from the light volume detection means is equal to the reference output value of the reference value outputting means. The control means controls light emission of each light emission means based on the light emission control value stored in the memory means.

With the present data recording device for a motion picture film, each light emission means is lighted responsive to data concerning an image. The light volume detection means detects the light emission volume of each light emission means to send a detected output value to the control means. The control means compares the reference output value of the reference value outputting means to a detected output value of the light volume detection means to control light emission of each light emission means so that the reference output value will be equal to the detected output value.

Since each light emission means operates with the uniform light emission volume during data recording, printing fluctuations of recording patterns of the negative motion picture film can be reduced to improve the SN ratio at the time of reproduction of a positive film produced from the negative film.

If the memory means is provided, the light emission control value of each light emission means for which each detected output value becomes equal to the reference output value is taken into the memory means. The control means controls the light emission of each light emission means based on the light emission control value.

This enables each light emission means to be controlled in light emission prior to data recording to reduce printing fluctuations of recording patterns of the motion picture film easily and reliably to improve the SN ratio at the time of reproducing the positive film obtained from the negative film.

BRIEF DESCRIPTION OF THE DRAWINGS

FIG. 14(a) and 14(b) cross-sectional views showing the head portion and specifically showing the state of emission of the light audio data via the light path forming portion.

BEST MODE FOR CARRYING OUT THE INVENTION

The best mode for carrying out the present invention is now explained by ref the drawings.

Figure 1:
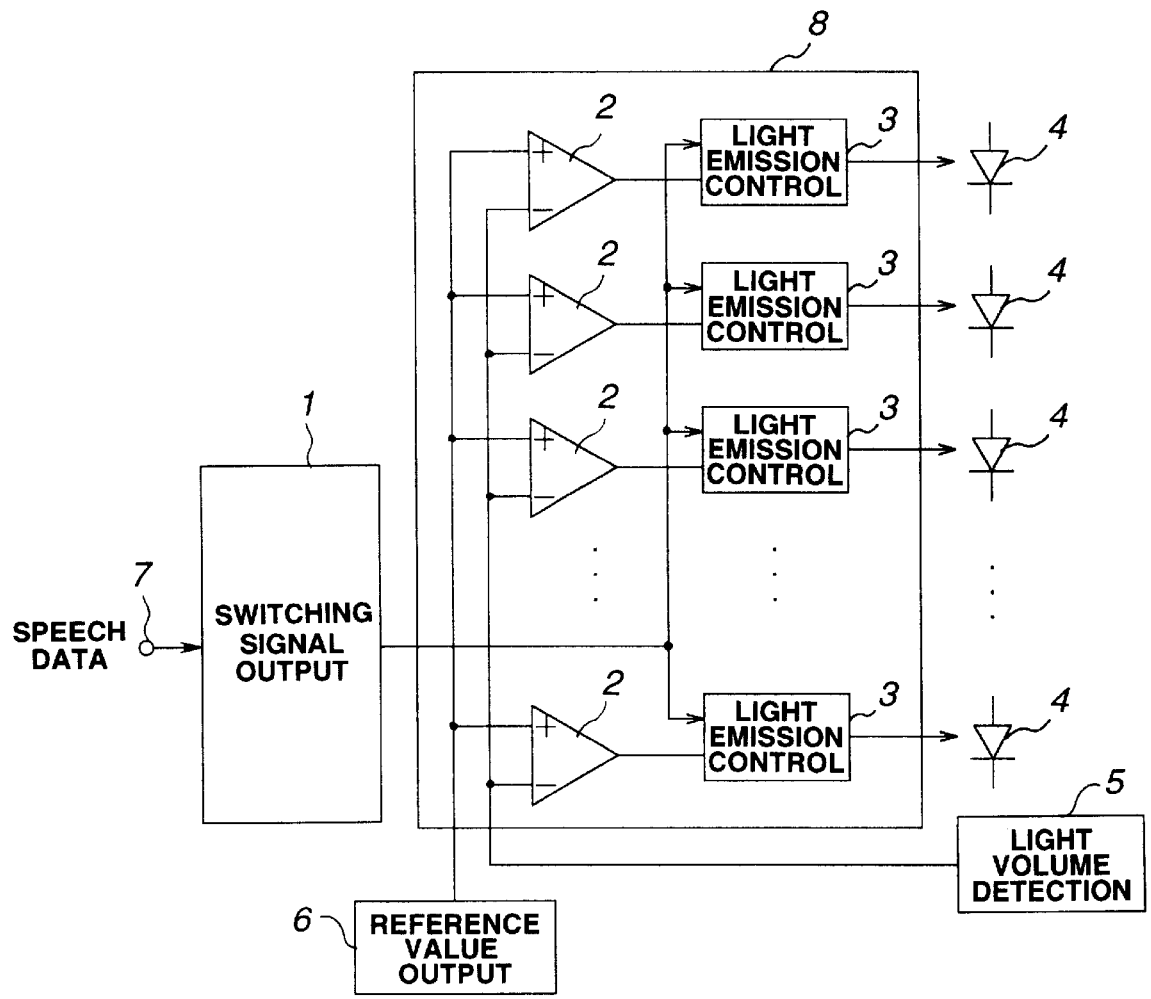
FIG. 1 illustrates the structure of essential portions of a data recording device for a motion picture film according to the present invention.

Referring to FIG. 1, the data recording device of the present invention includes a plurality of LEDs 4, as light emission means, lighted and driven depending erring to on data of an image of a motion picture film, and a light volume detector 5 for detecting the volume of light emission of each LED 4. The data recording device also includes a reference value outputting unit 6 for outputting a reference output specifying a reference value of the light emission volume of the LED 4, and a controller 8 for comparing the reference output value of the reference value outputting unit 6 and each detected output value of the light volume detector 5 for controlling the light emission of the LEDs 4 so that each detected output value will be equal to the reference output value.

The data concerning the image is audio data concerning the image.

In the data recording device, each LED 4 is lighted and driven responsive to data concerning an image. The light volume detector 5 detects the light emission volume of each LED 4 to send the detected output value to the controller 8. The controller compares the reference output value of the reference value outputting means to the detected output value of the light volume detection means to control light emission of each LED 4 so that the reference output value will be equal to the detected output value.

In the present data recording device, 1-line audio data recorded on the motion picture film is recorded with, for example, 64 dots. The audio data is recorded on the line basis. Therefore, the number of the LED drivers 3 and that of the LEDs 10 are each 64.

A switching signal outputting unit 1 outputs a switching signal to a light emission controller 3 of the controller 8. The switching signal controls on/off of each LED 4 based on digital audio data entered from an input terminal 7.

For light emission driving of the LEDs 4, the reference value outputting unit 6 sends a reference output value specifying a target light emission volume to a comparator 2 of the controller 8.

The controller 8 includes a number of comparators 2 corresponding to the number of the LEDs 4 and a number of the light emission controllers 3 equal to the number of the comparators 2, and performs control so that the light emission volume of the entire LEDs 4 will be equal to the reference output value.

For example, the comparator 2 has its inverting input terminal fed with a detected output value from the light volume detector 5 as later explained, while having its non-inverting input terminal fed with a reference output value from the reference value outputting unit 6. The comparator compares the detected output value to the reference output value to send the result of comparison to the light emission controllers 3.

The light emission controllers 3 actuates the associated LED4 for light emission and for controlling its light emission. In an initial state, the light emission controllers 3 sends a pre-set light emission driving power to the LED 4 and, if fed with the comparison output from the comparator 2, controls the light emission driving power responsive to the comparison output.

If, for example, the comparison output is positive, the detected output value is larger than the reference output value. Therefore, the light emission controllers 3 controls the light emission control value for reducing the light emission driving power. If the comparison output is zero, the detected output value is equal to the reference output value, so that the light emission controllers 3 controls the light emission control value for maintaining the light emission driving power at the constant value. If the comparison output is negative, the detected output value is smaller than the reference output value, so that the light emission controllers 3 controls the light emission control value for increasing the light emission driving power.

The LED 4 is lighted when supplied with the light emission driving power. The light emission volume is varied depending on the magnitude of the light emission driving power.

The light volume detector 5 includes light receiving means, such as photodiode or so-called CCD, and an A/D converter. The light volume detector 5 first converts the light emission volume of the LED 4 by the light receiving means into electrical signals. These electrical signals are converted by the A/D converter into digital signals which are then routed to the comparator 2.

By the above structure, each LED 4 operates with a uniform light emission volume during data recording, so that printing variations of the recording patterns of a negative film of a motion picture film can be reduced thus improving the SN ratio at the time of reproduction of the positive film obtained from this negative film.

Figure 2:
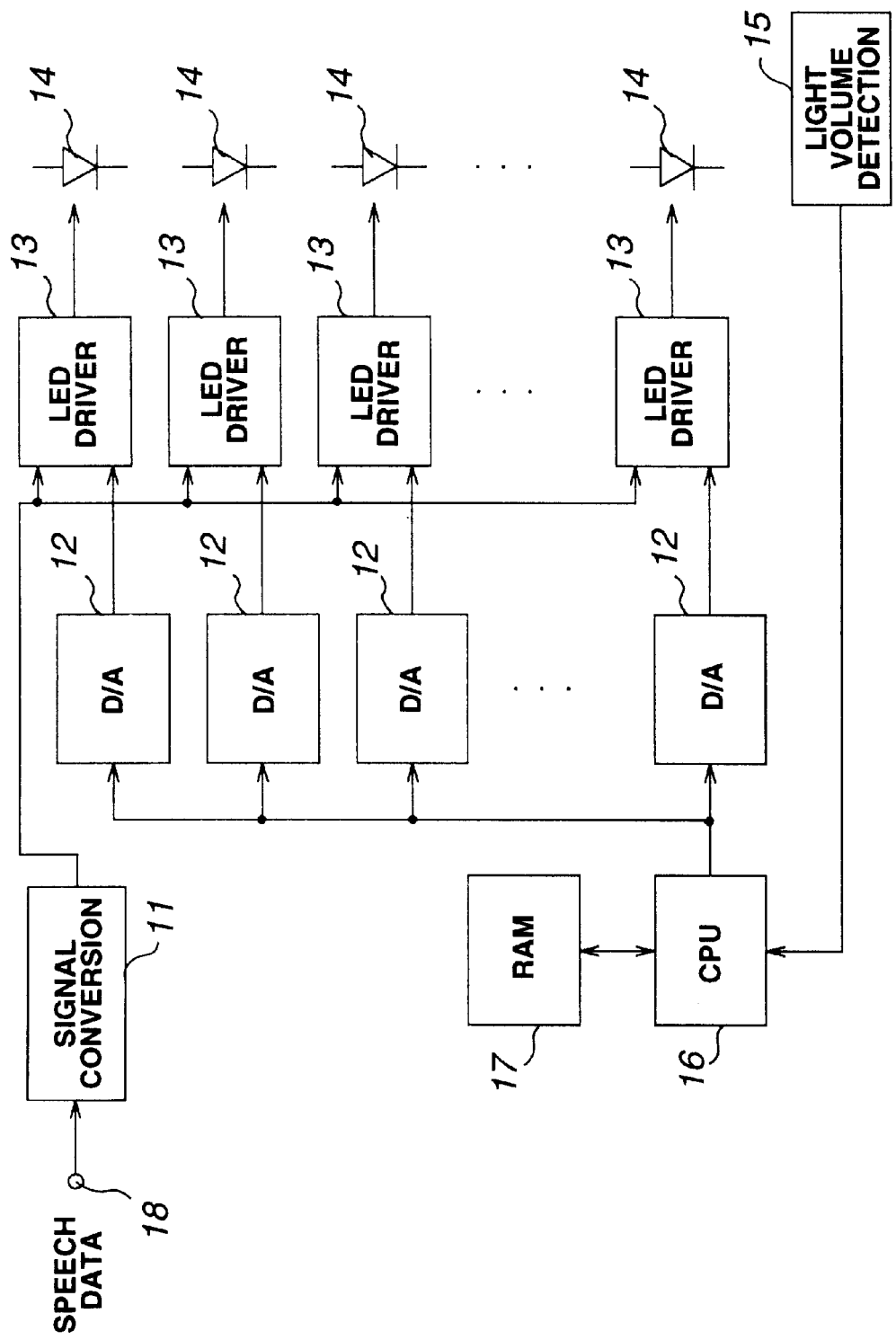
FIG. 2 illustrates the structure of essential portions of another data recording device for a motion picture film according to the present invention.

Referring to FIG. 2, the data recording device for the motion picture film according to the present invention includes a plurality of LEDs 14 lighted responsive to data corresponding to an image of the motion picture film, a light volume detector 15 for detecting the emission light volume of each LED 14 and a reference value outputting unit 21 for outputting a reference output specifying the reference value of light emission volume of each LED 14. The data recording device also includes a CPU 16 operating as controlling means for comparing the reference output value of the reference value outputting unit 21 to the detected output values of the light volume detector 15 for light-emission controlling the LEDs 14 so that the detected output values will be equal to the reference output value. There is provided a RAM 17 as storage means for storing the light emission control values for the respective LEDs 14 prevailing when the detected output values become equal to the reference output value. The CPU 16 light-emission controls the LEDs 14 based on the light emission control value stored in the RAM 17.

The data concerning the image is the audio data associated with the image.

In the data recording device for the motion picture film shown in FIG. 2, each LED 14 is lighted responsive to the data concerning the image.

The light volume detector 15 detects the light emission volume of each LED 14 and sends a detected output value to the CPU 16. The CPU compares the reference output value of the reference value outputting means in the CPU 16 to the detected output value from the light volume detector 15 to control light emission of each LED 14 so that the reference output value will be equal to the detected output value.

The CPU 16 performs control so that the light emission control value of each LED 14 for which each detected output value is equal to the reference output value will be taken into the RAM 17 in order to control the light emission of each LED 14 based on the light emission control value.

Similarly to the switching signal outputting unit 1, the signal converter 11 outputs to each LED driver 13 associated with each LED 14 a switching signal for on/off control of each LED 14 based on the digital audio data entered at an input terminal 18.

The LED driver 13 outputs the light emission driving power to each LED 14 as described above. The magnitude of the light emission driving power is varied with a comparison output as later explained.

The LED 14 is lighted when supplied with the light emission driving power. This light emission volume is varied with the magnitude of the supplied light emission driving power.

The light volume detector 15 includes a photodiode (PD) 20 and an A/D converter 19. The light emission volume of each LED 14 is detected by the photodiode 20 and the detected output value is converted into electrical signals. The electrical signals are then converted by an A/D converter 19 into digital signals which are routed to the CPU 16.

The CPU 16 has a reference value outputting unit 21 for outputting the reference output value and compares the reference output value to the detection output of the light volume detector 15 to route a comparison output to the D/A converter 12.

The comparison output is classed into positive data, zero data and negative data.

The positive data results if the detected output value is larger than the reference output value. The CPU 16 then routes a control signal which will reduce the light-emission driving power outputted by the LED driver 13, such as a light emission control value of "−1", to the D/A converter 12.

The zero data results if the detected output value is equal to the reference output value. The CPU 16 then routes a control signal which will keep the light-emission driving power outputted by the LED driver 13 unchanged, such as a light emission control value of "0", to the D/A converter 12.

The negative data results if the detected output value is smaller than the reference output value. The CPU 16 then routes a control signal which will enlarge the light-emission driving power outputted by the LED driver 13, such as a light emission control value of "+1", to the D/A converter 12.

The RAM 17 can exchange data with the CPU 16 bidirectionally and is a portion storing for each LED driver 13 the information as to which light control value given to which LED driver 13 has led to zero comparison output data.

With the present data recording device for the motion picture film, each LED 14 is controlled as to light emission prior to data recording.

That is, a pre-set power is supplied from the CPU 16 to the LED driver 13 associated with an optional LED 14. The light emission volume of the LED 14, driven for light emission by the LED, driver 13 supplied with the power, is detected by the light volume detector 15, and a detection output value is sent to the CPU 16. The CPU 16 compares the detected output value to the reference output value to produce a comparison output. If the comparison output is positive or negative, the light emission control value is decreased or increased, respectively, for again detecting the light emission volume of the LED 14. This feedback control is continued until the comparison output becomes equal to zero. If the comparison output is equal to zero, a similar sequence of operations is performed on the next LED 14.

The light emission control value obtained during this light emission control is stored in the RAM 17.

In this manner, light control is carried out so that the light emission volume corresponding to the reference output value is achieved for all LEDs 14.

Specifically, during data recording, each LED driver 13 sends to the associated LED 14 the light emission driving power corresponding to the light emission control value taken into the RAM 17 so that the same light volume is emitted by all LEDs 14.

The above structure enables each LED 14 to be controlled as to light emission prior to data recording to reduce printing variations of the recording patterns of the negative of the motion picture film to improve the SN ratio at the time of reproduction of the positive obtained from the negative.

Figure 3:
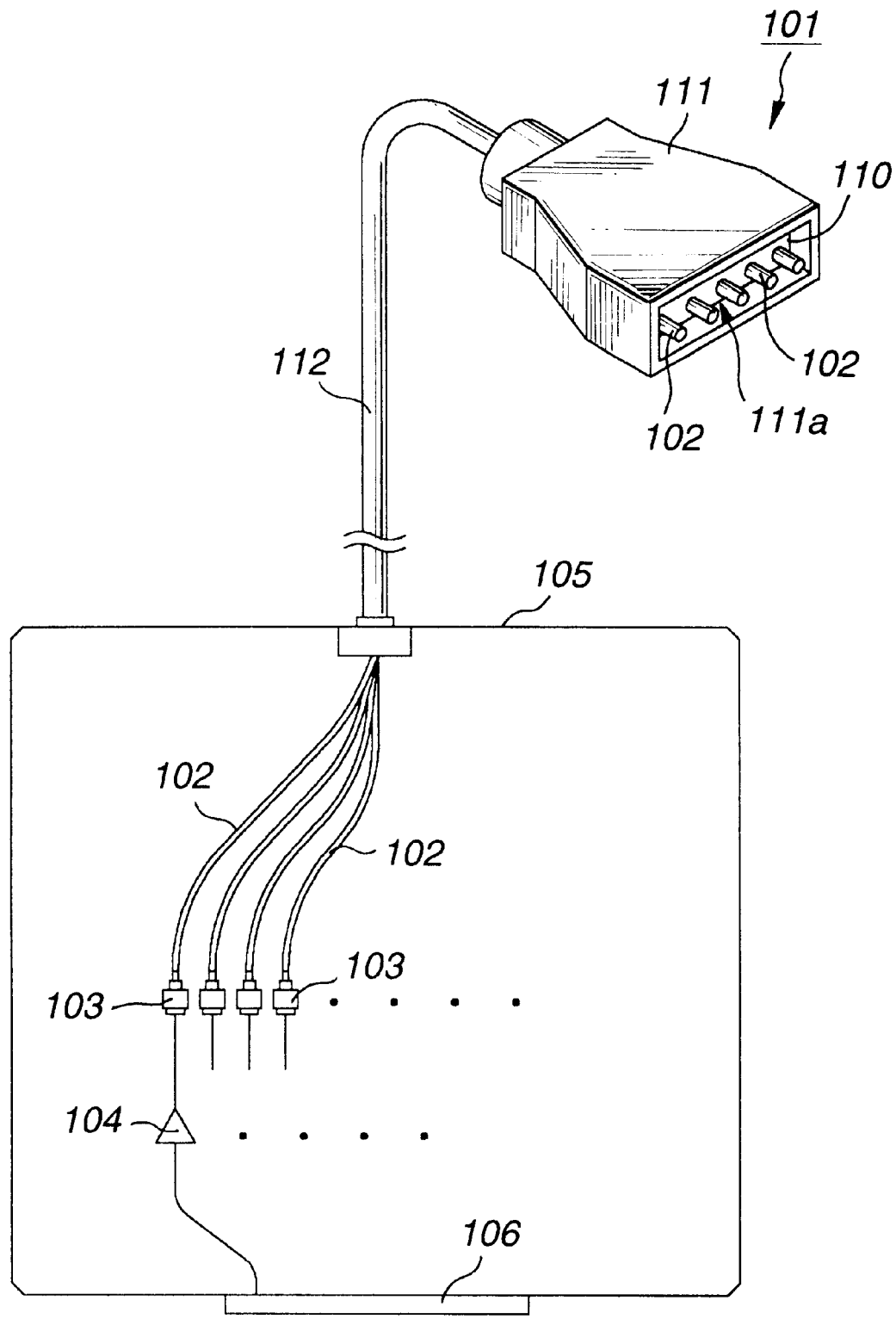
FIG. 3 illustrates the structure of essential portions of a light emitting portion employing an LED used in the data recording devices of FIGS. 1 and 2.
Figure 4:
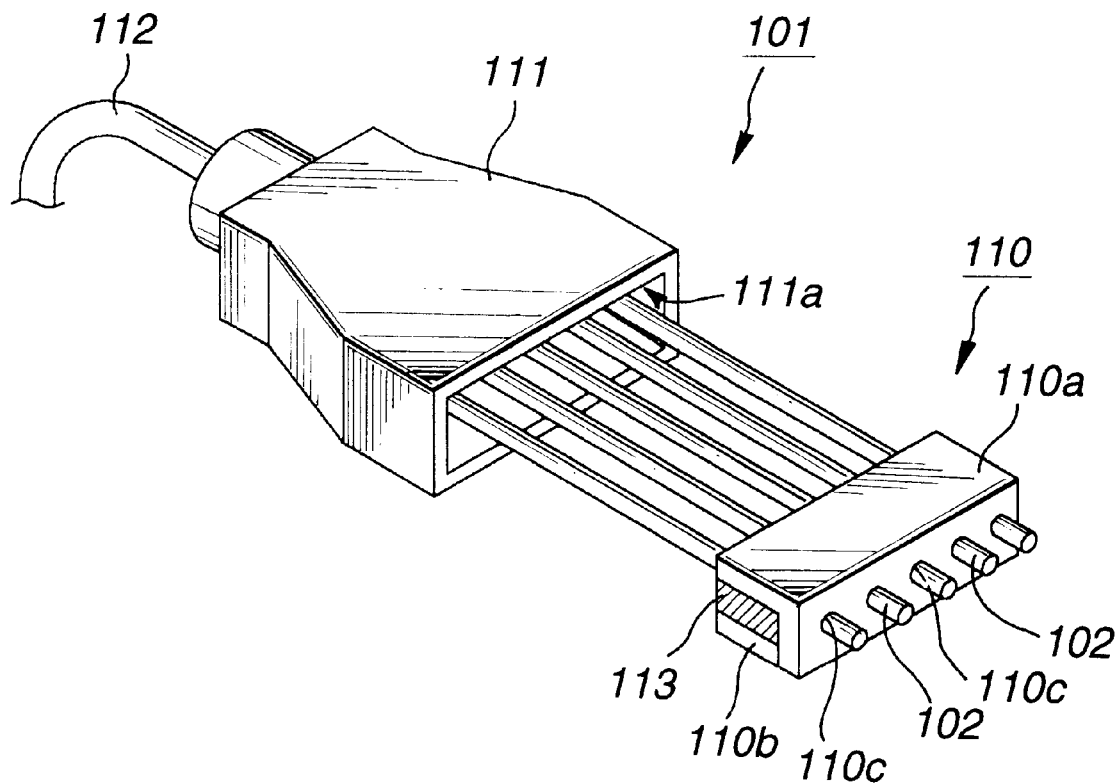
FIG. 4 illustrates the structure of a head portion provided in the data recording device for the motion picture film employing the light emitting portion.

The LED portion, that is the light emission portion, of the data recording device for the motion picture film, shown for example in FIG. 3, includes a head portion 101 for illuminating light audio data on a motion picture film, and a plurality of optical fiber elements having the ends thereof arrayed by the head portion 101 in meeting with a data pattern for recording. The LED portion also includes a plurality of light-emitting diodes (LEDs) 103 having the opposite ends of the optical fiber elements 102 connected to the light emitting portions and adapted for being lighted in meeting with the audio data for recording, and a plurality of amplifier circuits 104 for supplying audio data amplified by a pre-set gain to the respective light-emitting diodes 103.

In the above-described data recording device for the motion picture film, one-line audio data recorded on the motion picture film is recorded with, for example, 64 dots, with the audio data being recorded on the line basis. To this end, each 64 of the optical fiber elements 102, light emitting diodes 103 and the amplifier circuits 104 are provided and accommodated in a circuit board 105.

The portions of the optical fiber elements emerging from the circuit board 105 are collectively coated by a fiber cover 112 and led in their entirety to the head portion 101.

The input sides of the amplifier circuits 104 are connected to a connector terminal 106 of the circuit board 105. To this connector terminal 106 is supplied audio data from the encoder.

The head portion 101 is substantially L-shaped in cross-section, and includes an upper head 110a and a flat-plate-shaped lower head 110b, and a head cover 111 for covering the head 110. The upper head 110a has in its front portion 110d an opening 110c slightly larger in diameter than the optical fiber element 102, with the opening 110c being formed linearly in meeting with the data pattern for recording. The head cover 111 has a substantially rectangular radiation port 111a in meeting with the outer profile of the head 110.

Each optical fiber element 102 is led by the file cover 112 int the inside of the head cover 111 so as to be led via the radiation port 111a of the head cover 111 to each opening 110c for the optical fiber element. After being guided to the opening 110c for the optical fiber element, the optical fiber elements 102 have their distal ends aligned linearly and secured with an adhesive 113 in this state in the head 110 for evading wobbling. After the optical fiber element 102 is secured in this manner with the adhesive 113, the head 110 is covered with the head cover 111 to constitute the head portion 101.

Figure 5:
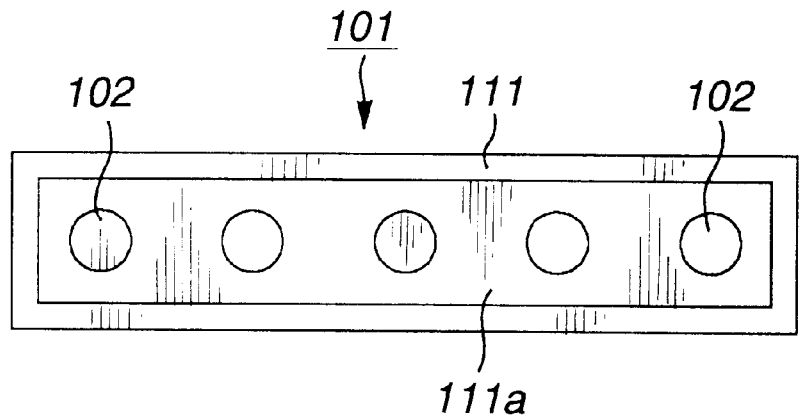
FIG. 5 is a front view of a light exiting port of the head portion.

The head cover 111 is provided on the head 110 so that the distal ends of the optical fiber elements 102 protruded from the head 110 will be aligned with the radiating port 111a, or so that the radiation port 111a will be projected slightly beyond the distal ends of the optical fiber elements 102. Thus, the front surface of the head portion 101 looks as if the distal ends of the optical fiber elements 102 peep outwards at the radiation port 111a of the head cover 111, as shown in FIG. 5.

Figure 6:
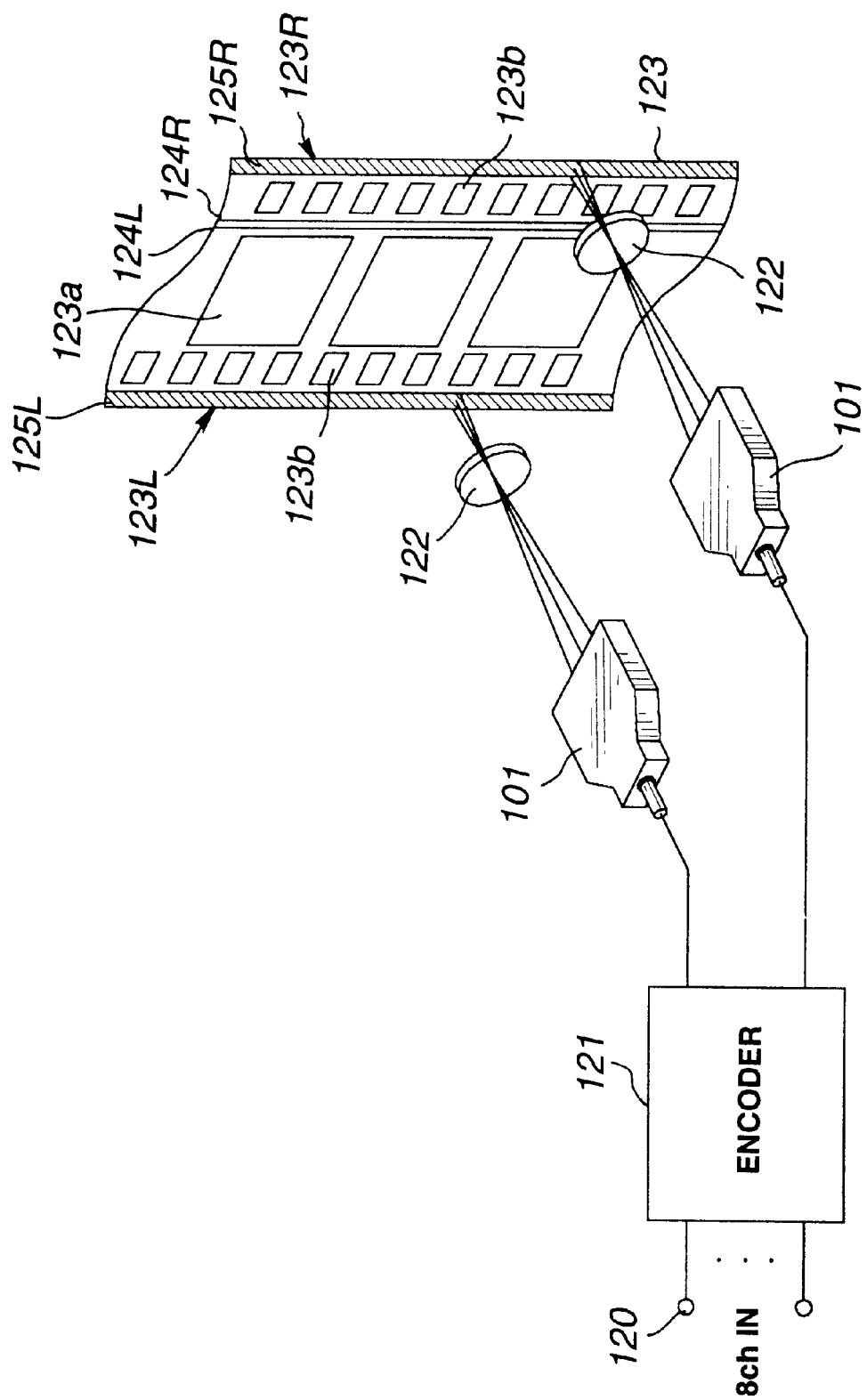
FIG. 6 shows how audio data is recorded in the data recording device for the motion picture film employing the light emitting portion.

The data recording device for the motion picture film, having the above-described light emitting portion, operates as follows:

Referring to FIG. 6, audio data is first supplied to an encoder 121 via e.g., an 8-channel input terminal 120. The encoder 121 encodes the audio data in a manner suited for recording, and sends the encoded data to a connector terminal 106 shown in FIG. 3. The audio data supplied to the connector terminal 106 is amplified at a pre-set gain by each amplifier circuit 104 so as to be sent to each LED. This lights the LED 103 responsive to audio data so that the electrical audio data is converted into light audio data which is radiated.

The light audio data is guided by the optical fiber element 102 to the distal end of the optical fiber element 102 for radiation via radiation port 111a of the head portion 101.

Referring again to FIG. 6, two of the head portions 101, namely the head portion for the right channel and that for the left channel, are provided for facing the motion picture film (negative film) 123.

That is, an image recording area 123a is provided at a longitudinal mid portion of the motion picture film 123 and left-hand and right-hand side perforations 123b are formed on both sides of the image recording area 123a. In addition, analog sound tracks 124R, 124L for right and left channels are provided between the right-hand side perforations 123b and the image recording area 123a.

Since the recording positions for the image recording area 123a, perforations 123b and the analog sound tracks 124R, 124L are standardized by the Society of Motion Picture and Television Engineers (SMPTE) which is as association of motion picture and television engineers in the United States, the audio data needs to be recorded in other areas than the above-mentioned recording positions for the image recording area 123a and the analog sound tracks 124R, 124L.

With the present data recording device for the motion picture film, a redundant area between the right perforations 123b and the right edge 123R of the motion picture film 123 is used as a digital sound track 125R for the right channel, while a redundant area between the left-hand side perforations 123b and the left-hand side edge of the motion picture film is used as a digital sound track 125L, with the audio data for each channel being recorded linearly along the film proceeding direction.

Thus, the head portions 101 for the respective channels are provided facing the digital sound tracks 125R, 125L, with the light audio data radiated from the head portions 101 being illuminated via recording head 122 on the digital sound tracks 125R, 125L via recording lens 122. This records dot patterns of audio data corresponding to the arraying state of the optical fiber elements 102 linearly arrayed on the head portion 101 on the digital sound tracks 125R, 125L on the line basis.

Figure 7:
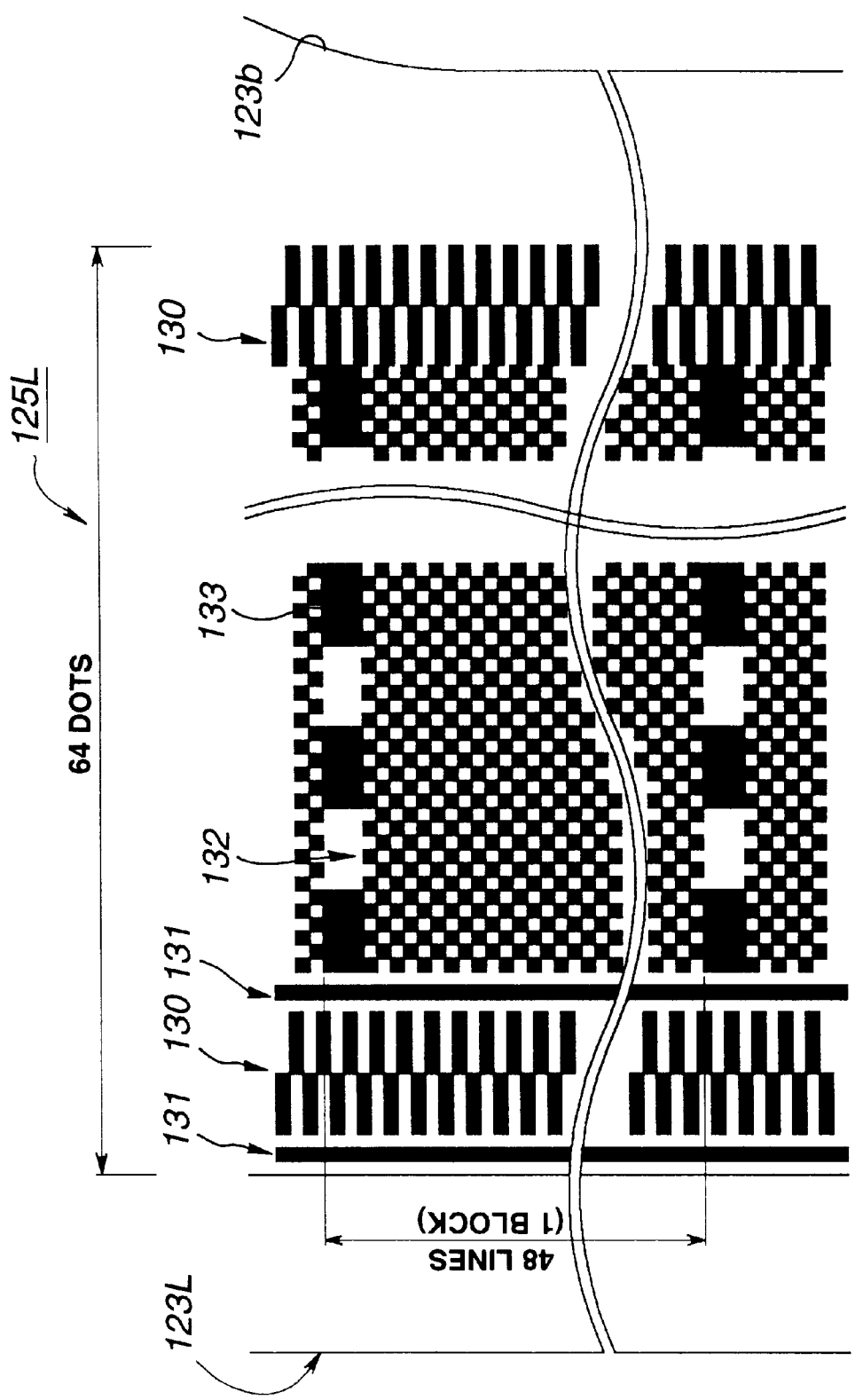
FIG. 7 shows a data pattern of audio data recorded by the data recording device for the motion picture film employing the light emitting portion.

Specifically, the audio data recorded on the digital sound track 125L for the left channel is as shown in FIG. 7, with each line being recorded with 64 dots in a direction perpendicular to the film proceeding direction. The audio data is recorded with, for example, 48 lines as one block. At the leading end of the block are recorded three lines of synchronization data 132 which is a repetitive pattern of six white dots and six black dots for block synchronization. The synchronization data 132 is followed by audio data 133.

On both sides of the synchronization data 132 and audio data 133 along the film proceeding direction is recorded a staggered tracking pattern 130 of white and black dots.

For facilitating discrimination of the boundary between the tracking pattern 130 and the audio data 133 (with synchronization data 132), there is recorded a discrimination pattern of black dots 131 for extending along the film proceeding direction on both sides of the tracking pattern 130 on the side of the left edge 123L. The discrimination pattern of black dots 131 is provided on the side of the right edge 123R for the digital sound track 125R for the right channel.

Since the present data recording device for the motion picture film is configured for guiding the light audio data from the respective LEDs 103 by the optical fiber elements 102, the distance between the LEDs 103 can be selected to be larger irrespective of the arraying of the optical fiber elements in the head portion 101.

Thus, if the LEDs 103 are heated by lighting, the evolved heat can be prevented from acting adversely on the LEDs 103 to improve durability of the LEDs 103. Moreover, there is no necessity of providing heat sink for heat radiation, thus improving durability and lowering the cost.

Since the optical fiber elements 102 are arranged linearly in the head portion 101, the dot patterns of audio data recorded on the digital sound tracks 125R, 125L can be recorded linearly, thus increasing the volume of recorded audio data.

Of course, the dot pattern can be arranged in a staggered pattern by adjusting the arraying state of the optical fiber elements provided in the head portion 101.

The light audio data radiated from the respective optical fiber elements 102 undergo variations in light volume in a direction from the center towards the periphery. Thus it is possible to provide a scattering plate, not shown, on the radiation port 111a of the head portion 101 for radiating the light audio data via this scattering plate. This enables the light audio data illuminated on the digital sound tracks 125R, 125L to be scattered uniformly as a whole to assure a substantially uniform light volume making up the dot pattern thus assuring even recording of the dot pattern in a manner free of fluctuations.

Figure 8:
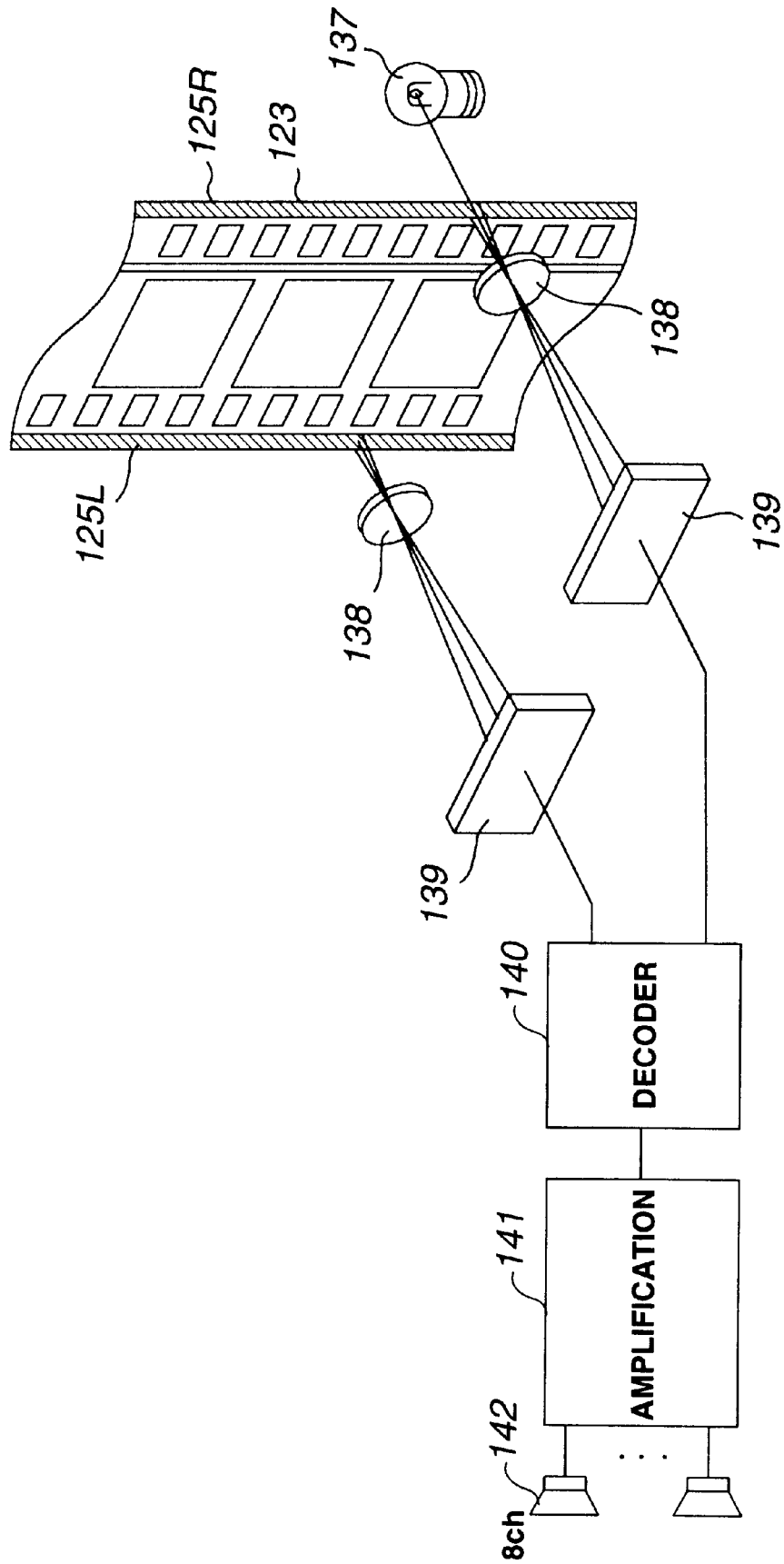
FIG. 8 illustrates the structure of a data reproducing device for a motion picture film employing the light emitting portion.

The audio data thus recorded on the motion picture film is reproduced by a data reproducing device for the motion picture film as shown for example in FIG. 8.

For reproducing the audio data, the data reproducing device for the motion picture film shown in FIG. 8 illuminates light rays by two halogen lamps 137 from the back surfaces of the digital sound tracks 125R, 125L of the motion picture film (positive film) 123. Since the audio data is recorded with white and black dot patterns, only the light illuminated on the white dot pattern is transmitted through the digital sound tracks 125R, 125L. Thus, the light from the halogen lamps 135 acquires the information by being transmitted through the digital sound tracks 125R, 125L so as to fall as light audio data on a reproducing lens 138.

The reproducing lens 138 converges the light audio data and illuminates the converged light audio data on a CCD line sensor 139 for each channel. The CCD line sensors 139 receive the light audio data to form electrical signals corresponding to the received light level, that is the electrical audio data, which is supplied to a decoder 140.

The decoder 140 decodes the audio data in a manner corresponding to the encoding performed at the time of recording to transmit the decoded audio data to an amplifier circuit 141. The amplifier circuit 141 amplifies the decoded audio data at a pre-set gain to transmit the amplified data to, for example, an 8-channel speaker 142.

This generates an audio output corresponding to the audio data reproduced from the digital sound tracks 125R, 125L of the motion picture film 123 via speaker 142.

Referring to FIG. 7, the tracking pattern 130 recorded on the digital sound tracks 125R, 125L is recorded so that the boundary line between the white and black dots is positioned on a line of extension of audio data. Thus, the detection level of the tracking pattern 130 intermediate between the detection level of the black dot and that of the white dot during audio data reproduction indicates the on-track state.

Thus, by controlling the tilt or readout of the CCD line sensor 139 or the tilt of the motion picture film so that the detection level of the tracking pattern 130 will be perpetually at the above-mentioned intermediate level for achieving tracking for reproducing the audio data, the audio data can be reproduced correctly on the on-track state at all times.

A data recording device for a motion picture film having a modified structure of a light emission unit is hereinafter explained.

Figure 9:
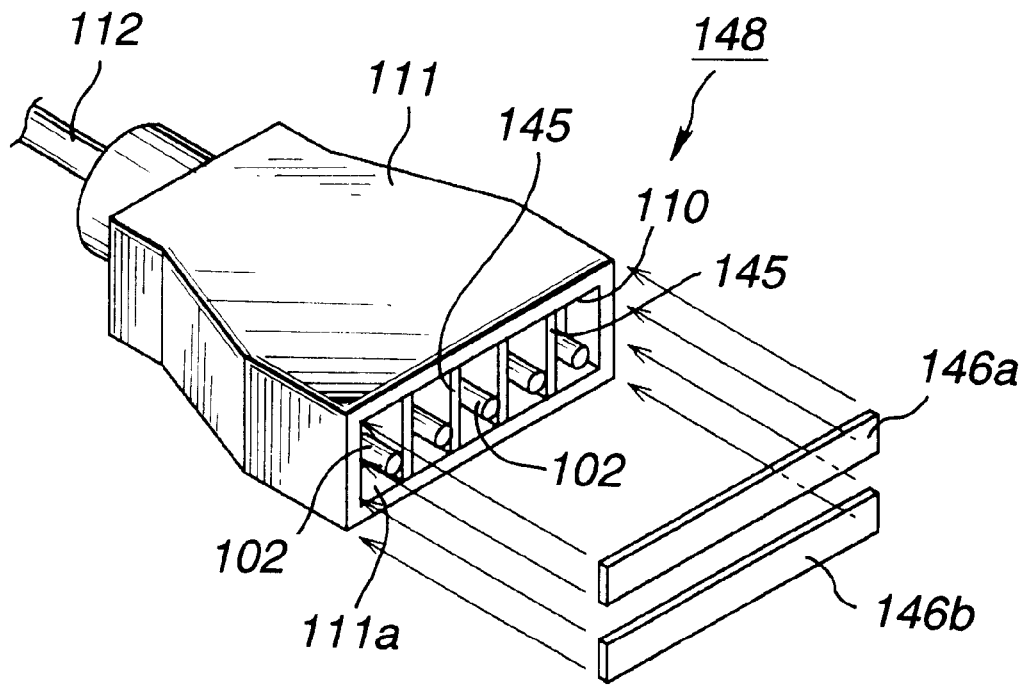
FIG. 9 is a perspective view showing the structure of a head portion of a light emitting portion employing the LED used in each of the above-mentioned data recording devices for the motion picture film.

The data recording device for a motion picture film of the present embodiment differs from the above-described embodiment of the data recording device for the motion picture film only with respect to the structure of the head portion 101 which is configured as a head portion 148 shown in FIG. 9. Therefore, in the following explanation of the present data recording device of the motion picture film, only the structure of the head portion 148 is explained, while the description of the other structures is omitted for simplicity. Also, in the following explanation of head portion 148, parts or components similar in structure to the head portion 101 are depicted by the same reference numerals without making specified explanation.

Figure 10:
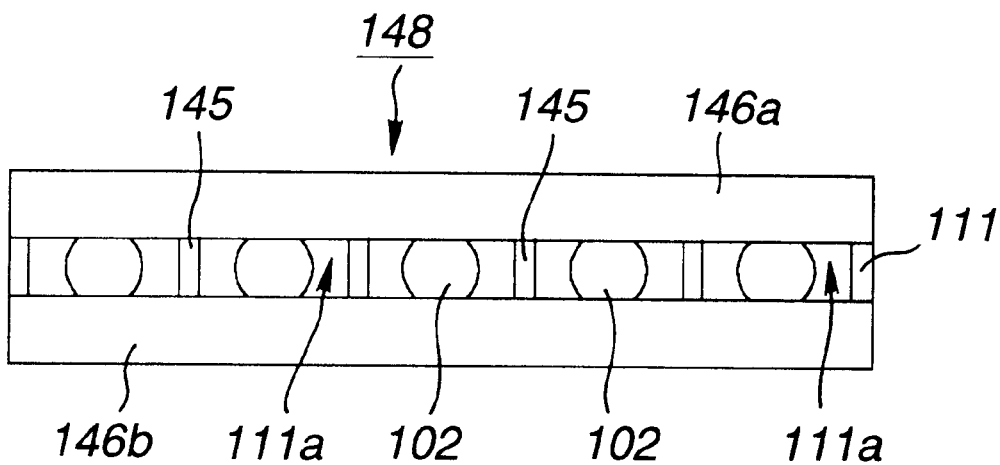
FIG. 10 is a front view of a light exiting port of the head portion of a data recording device for the motion picture film employing the light emitting portion.

Specifically, in FIG. 9, the head portion 148 includes a separator 145 for separating the radiation port 111a into plural sections from one optical fiber element 102 to another and light barrier plates 146a, 146b having substantially rectangular light barrier plates 146a, 146b as shown in FIG. 10.

This structure enables light audio data outgoing from each optical fiber 102 to be shielded by the light barrier plates 146a, 146b to assure the rectangular shape of the light audio data outgoing from the radiation port 110a.

For recording audio data on the digital sound tracks 125R, 125L, the motion picture film 123 is advanced at a pre-set speed for effecting the recording. In the data recording device for the motion picture film of the present embodiment, since the light shape of the light audio data illuminated on the digital sound tracks 125R, 125L can be set to a substantially rectangular shape, the dot pattern of audio data recorded on the digital sound tracks 125R, 125L can be set to a substantially square pattern by adjusting the relation between the light audio data illumination time and the proceeding velocity of the motion picture film 123.

Thus, the dot patterns of the audio data of the respective lines can be aligned with each other. Moreover, the recording volume of audio data can be increased to contribute to correct reproduction of audio data.

The light audio data radiated from the optical fiber elements 102 undergoes variations in the light volume in the direction proceeding from the center to the periphery, as described previously. Thus, a scattering plate, not shown, may be provided in the radiation port 111a of the head portion 148 so that the light audio data will be radiated via this scattering plate. This enables the light audio data illuminated on the digital sound tracks 125R, 125L to be scattered as a whole to assure a substantially uniform light volume forming a dot pattern. Thus, the dot pattern can be recorded evenly without fluctuations.

A data recording device for a motion picture film of a further modification is hereinafter explained.

Figure 11:
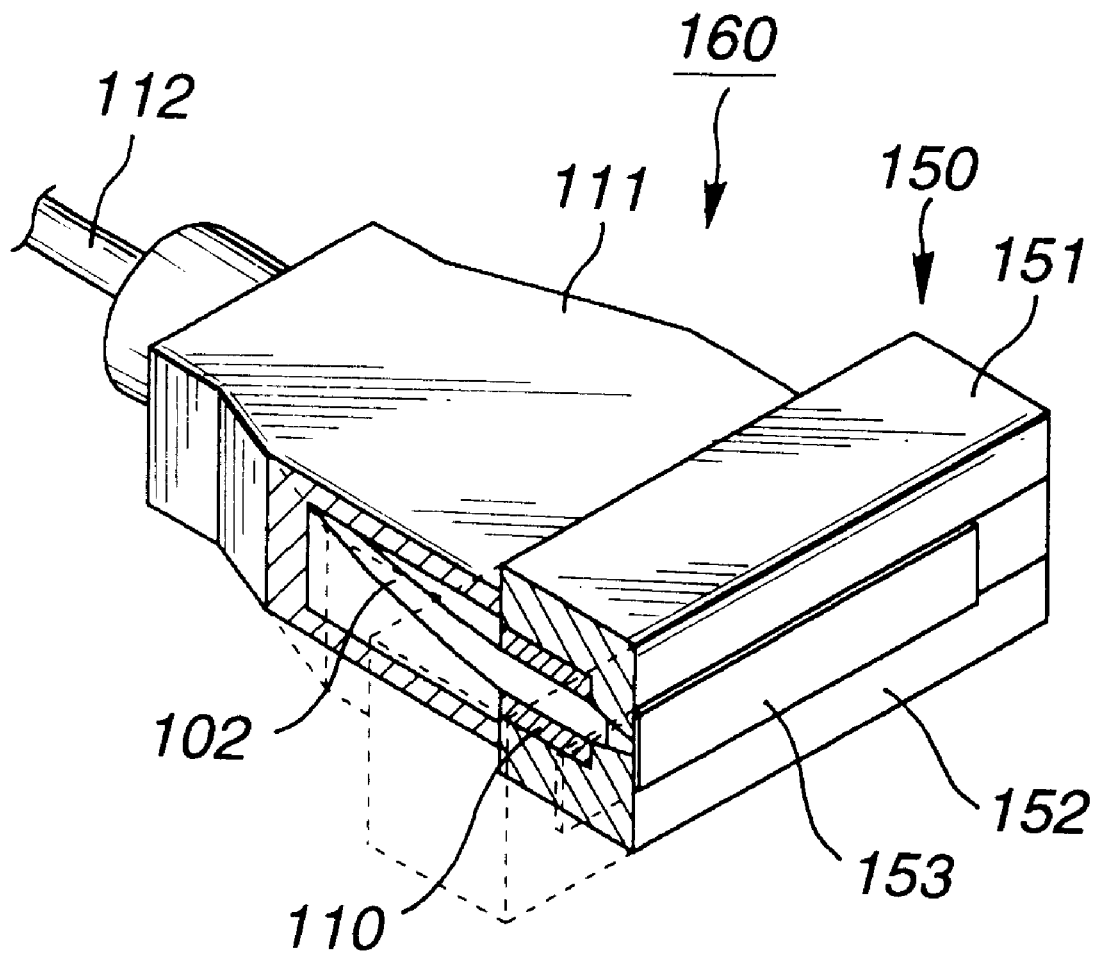
FIG. 11 is a perspective view showing the structure of a head portion of a light emitting portion employing the LED used in each of the above-mentioned data recording devices for the motion picture film.
Figure 12:
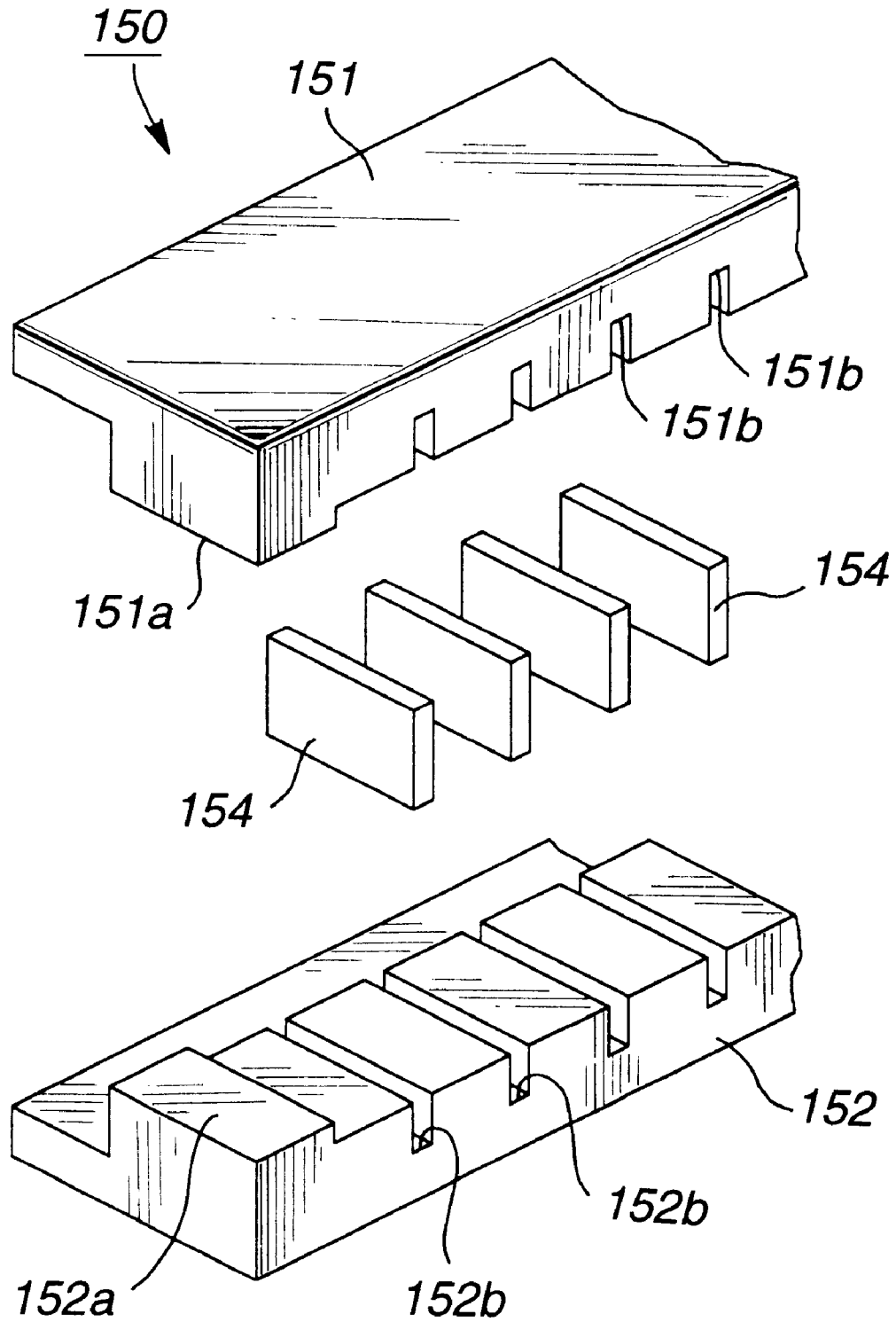
FIG. 12 shows a light path forming portion provided in the head portion of the data recording device for the motion picture film employing the light emitting portion.

The data recording device for a motion picture film of the present embodiment differs from the above-described first embodiment of the data recording device for the motion picture film only with respect to the structure of the head portion 101 which is configured as a head portion 160 shown in FIG. 11. Therefore, in the following explanation of the present data recording device of the motion picture film, only the structure of the head portion 148 is explained without making description of the other structures. Also, in the following explanation of head portion 148, parts or components similar in structure to the head portion 101 are depicted by the same reference numerals without making specified explanation.

Referring to FIG. 11, the head portion 160 has a light path forming portion 150 in the head 110, and the above-mentioned head cover 111 is secured to the light path forming portion 150.

The light path forming portion 150 includes an upper light path forming portion 151, a lower light path forming portion 152 and plural separators 154.

The upper light path forming portion 151 is formed with a number of separator holding grooves 151b in keeping with the optical fiber elements 102. The separator holding grooves 151b can barely hold the separators 154. On both sides of the upper light path forming portion 151 are formed adhesive surfaces 152a for bonding to the upper light path forming portion 151.

Similarly to the upper light path forming portion 151, the lower light path forming portion 152 is formed with a number of separator holding grooves 152b in keeping with the optical fiber elements 102. The separator holding grooves 152b can barely hold the separators 154. On both sides of the lower light path forming portion 152 are formed adhesive surfaces 152a for bonding to the upper light path forming portion 152.

Figure 13:
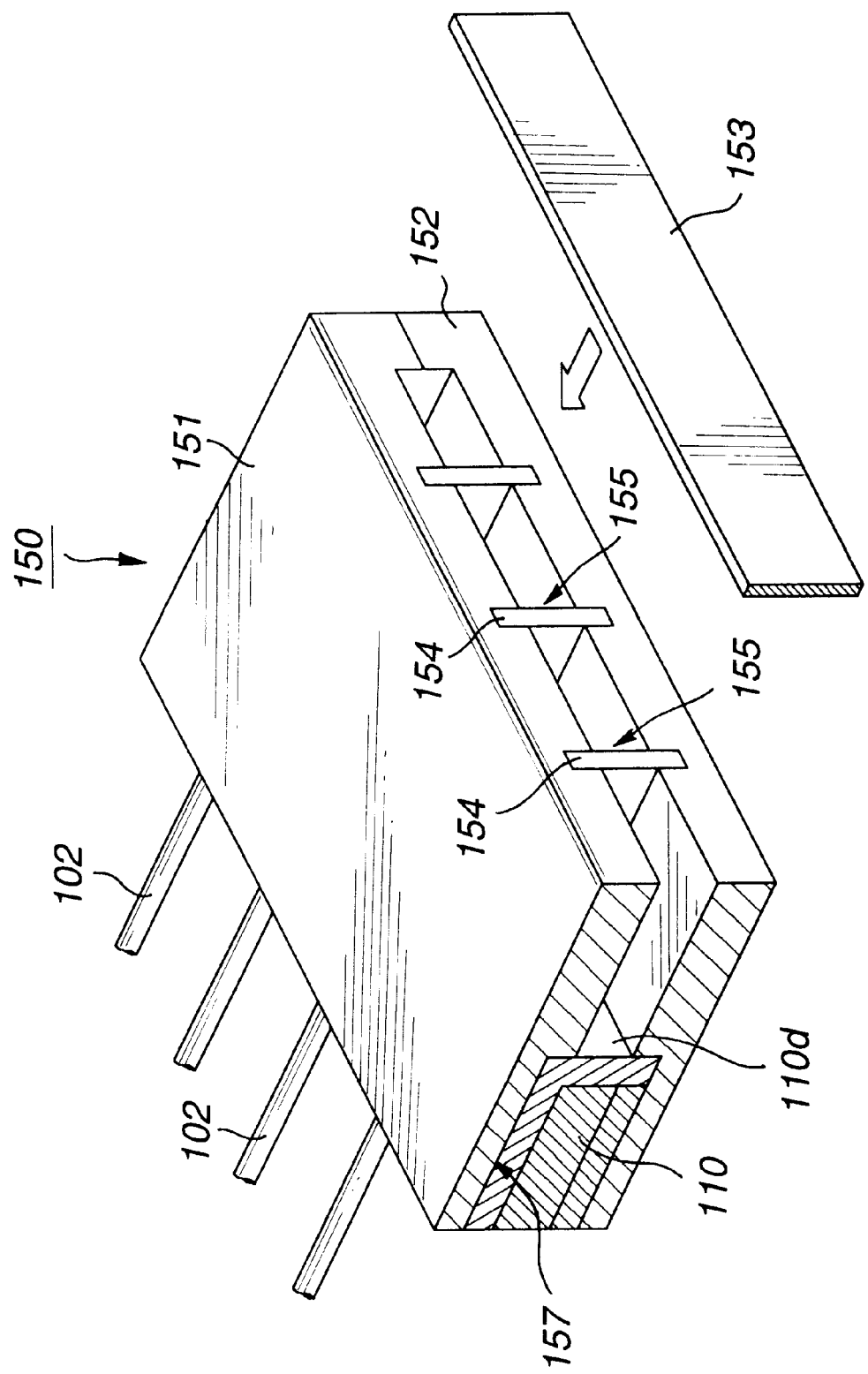
FIG. 13 is a perspective view showing the light path forming portion provided in the head portion.

The separator holding grooves 151b, 152b are provided for facing each other when the bonding surfaces 151a, 152a of the upper and lower light path forming portions 151, 152 are bonded to each other, as shown in FIG. 13. Thus, when the separators 154 are inserted into the separator holding grooves 151b, 152b and the bonding surfaces 151b, 152b are bonded to each other, plural substantially rectangular sections of the radiation port 155 corresponding to the number of the optical fiber elements 102 are formed. The radiation port sections 155 are smaller in size than the front side 110d of the head 110. A scattering plate 153 is provided in the radiation ports 155.

Thus, when the head portion 160 provided with the scattering plate 153 is viewed from the front side, the radiation port sections 155 are covered with the scattering plate 153, as shown in FIG. 14b.

On the other hand, when the bonding surfaces 151a, 152a of the upper and lower light path forming portions 151, 152 are bonded for forming the light path forming portion 150, a head housing section 157 slightly larger than the outer profile of the head 110 is formed on the opposite side to the radiation port sections 155. In this head housing section 157 is housed the head 110.

The head portion 160 is constituted by bonding the back side of the light path forming portion 150 housing the head 110 to the head cover 111 as shown in FIG. 14a.

By constructing the head portion 160 in this manner, the light audio data, radiated from the optical fiber element 102, is radiated as a substantially rectangular light audio data by being passed through the light path formed by the light path forming portion 150 and the radiation port 155, as shown in FIG. 14a. The light audio data is scattered properly by the scattering plate 153 so as to be illuminated on the digital sound tracks 125R, 125L.

For recording audio data on the digital sound tracks 125R, 125L, the dot pattern of audio data recorded on the digital sound tracks 125R, 125L can be set to a substantially square pattern by adjusting the relation between the light audio data illumination time and the proceeding velocity of the motion picture film 123.

Thus, the dot patterns of the audio data of the respective lines can be aligned with each other. Moreover, the recording volume of audio data can be increased to contribute to correct reproduction of audio data.

Moreover, since the light audio data radiated from the radiation port 155 is suitably scattered by the scattering plate 153 so as to be illuminated on the digital sound tracks 125R, 125L, the light volume of the light audio data illuminated on the digital sound tracks 125R, 125L can be rendered uniform to enable the dot pattern of the audio data to be recorded evenly without fluctuations .

In the present data recording device for the motion picture film, the scattering plate can be omitted, in which case the square-shaped dot pattern can be recorded on the motion picture film 123 as described above.

In the above explanation of the data recording device for the motion picture film, the number of audio data recorded on the motion picture film 123 is 64 dots per line, while the numbers of the optical fiber elements, LEDs 103 and the amplifier circuits 104 are also 64 in keeping therewith. However, this is merely illustrative and, for example, the number of audio data er line may also be set to 90 and the numbers of the optical fiber elements, LEDs 103 and the amplifier circuits 104 may also be set to the same number. Various other changed may be made within the technical scope of the invention.

By applying the LED as described above, the optical fiber elements are arranged in keeping with the data pattern in accordance with the data pattern, and the light audio beam from the LED is guided by the optical fiber elements so as to be illuminated from the head portion to the motion picture film, so that the optical fiber elements can be arranged linearly. This enables audio data to be recorded linearly on the motion picture film to increase the audio data volume recorded on the motion picture film.

Moreover, the separation between the LEDs can be increased without regard to the separation between the optical fiber elements arranged in a pattern in the head portion. Thus, the heat evolved on heating the LEDs can be prevented from acting adversely on the neighboring LEDs 103 to improve durability of the data recording device. Moreover, there is no necessity of providing heat sink for heat radiation, thus improving durability and lowering the cost.

In addition, since the radiation port of the head portion is separated into plural sections by the separators and the light shielding plates are provided so that the radiation port separated into plural sections by the separators is substantially of a rectangular shape, the light shape of the light audio data radiated from the LEDs can be set to a rectangular shape to provide a rectangular shape of the data pattern recorded on the motion picture film.

Alternatively, the head portion has a light path forming portion for radiating the light audio data from the optical fiber elements via the substantially rectangular light path and the separators are provided for separating the radiation port of the light path forming portion into plural sections for respective optical fiber elements, the light shape of the light audio data radiated from the LEDs can be set to a rectangular shape to provide a rectangular shape of the data pattern recorded on the motion picture film.

Moreover, since the scattering plate is provided in the radiation port of the head portion or in the radiation port of the light path forming portion, the light audio data illuminated on the motion picture film can be of substantially uniform light volume without fluctuations, thus enabling the data patterns to be recorded uniformly without fluctuations. Since the light emission means in the data recording device for the motion picture film according to the present invention operates with the uniform light emission volume, printing fluctuations of the recording pattern of the negative of the motion picture film can be reduced, thus improving the SN ratio at the time of reproducing the positive obtained from the negative film. Specifically, in recording the digital audio data on the motion picture film, the negative film can be improved in quality inexpensively.

By providing the memory means, the light emission means can be previously controlled in light emission prior to data recording, thus enabling printing fluctuations of the recording pattern of the motion picture film to be reduced easily reliably while improving the SN ratio at the time of reproducing the positive film obtained from the negative film. That is, the negative film can be improved in quality at the time of recording the digital audio data on the motion picture film.

I claim:

1. A data recording apparatus for a motion picture film for digitally recording data concerning an image of the motion picture film, comprising:

a plurality of light emission means lighted responsive to said data concerning an image;

light volume detection means for detecting the light emission volume of each of said light emission means;

reference value outputting means for outputting a reference output specifying a reference value of the light emission volume of said light emission means; and control means for comparing the reference output value of said reference value outputting means to each detected output value from said light volume detection means for controlling the light emission of said light emission means so that each detected output value will be equal to said reference output value.

2. The data recording apparatus as claimed in claim 1 further comprising:

memory means for storing the light emission control value of each light emission means when each detected output value from said light volume detection means is equal to the reference output value of said reference value outputting means; said control means controlling light emission of each light emission means based on the light emission control value stored in said memory means.

3. The data recording apparatus as claimed in claim 2 wherein the data concerning the image is audio data associated with the image.

* * * * *